US005819392A

United States Patent [19]

Rigosi et al.

[11] Patent Number: 5,819,392

[45] Date of Patent: Oct. 13, 1998

[54] PROCESS FOR COATING THE INSIDE SURFACE OF METAL CONTAINERS WITH POLYOLEFIN MATERIALS

[75] Inventors: Gian Luigi Rigosi; Roberto Marzola; Gian Pietro Guidetti, all of Ferrara, Italy; Dino Bacci, Brussels; Georges Asperti, Ottignies L-L-N, both of Belgium

[73] Assignees: Montell North America Inc., Wilmington, Del.; Soveco S.A., Vesenaz, Switzerland

[21] Appl. No.: 172,517

[22] Filed: Dec. 21, 1993

[30] Foreign Application Priority Data

Dec. 13, 1992 [IT] Italy ................................ MI92A2948

[51] Int. Cl.[6] ................................................ B23P 25/00

[52] U.S. Cl. ........................................ 29/458; 427/475

[58] Field of Search ...................... 29/458, 773; 427/478

[56] References Cited

U.S. PATENT DOCUMENTS

| | | | |
|---|---|---|---|
| 1,921,247 | 8/1933 | Walker | 29/458 X |
| 4,198,327 | 4/1980 | Matsumoto et al. | 260/4 |
| 4,350,797 | 9/1982 | Marzola | 525/293 |

FOREIGN PATENT DOCUMENTS

| | | |
|---|---|---|
| 134491 | 3/1985 | European Pat. Off. . |
| 483523 | 5/1992 | European Pat. Off. . |

*Primary Examiner*—Joseph M. Gorski

[57] ABSTRACT

Disclosed is a process for coating the inner surface of metal containers by deposition of specific polyolefin compositions on the separate parts of the containers, subsequent assembly of the parts and melting of the polyolefin compositions.

6 Claims, No Drawings

PROCESS FOR COATING THE INSIDE SURFACE OF METAL CONTAINERS WITH POLYOLEFIN MATERIALS

The present invention relates to a process for coating the inner surface of metal containers by electrostatic deposition of polyolefin compositions in powder form and to an apparatus suitable for carrying out said process.

Various processes are known in the art for coating the inside of metal containers which are used, for example, for aggressive substances, in particular oxidizing and corrosive substances, or food products.

The coating materials used in most processes are paints and lacquers based on aminoplastic resins or epoxy resins with a phenol base.

The technique and specific coating material are selected depending on the type of container and the substances for which said container will most likely be used. For example, utilizing the above mentioned paints or lacquers, the coating can be applied with processes using spraying techniques.

However, the use of the above mentioned paints and lacquers requires complicated and costly apparatuses and processes. In fact, in order to obtain good results, the metal surface to be coated must be thoroughly cleaned. Moreover, the spraying techniques require the use of solvents that must be recovered and require the use of plants equipped with containment and vapor abatement systems. In the case where the containers are used for food products, or particularly aggressive or polluting substances, it is also advisable to use, besides the above mentioned coating, either bags or inserts inside the metal ones, generally made of polyethylene or PVC.

It is obvious, therefore, that the above mentioned coating materials and processes commonly used in the art present a number of disadvantages, among which are:

- the complexity of the apparatuses and the operations necessary to obtain the coating;
- the need to use different kinds of materials and techniques depending on the use for which the product is destined;
- the use of polluting substances (solvents).
- the need to use additional bags and inserts in the case of metal containers destined for particular uses.

The Applicant has now found a process for coating the inside surface of metal containers which overcomes said disadvantages. In fact, the process of the present invention is based on the electrostatic deposition and subsequent melting of powders of polyolefin compositions, to obtain coatings having a high chemical inertia, as well as excellent mechanical properties.

Therefore, said coatings can be applied to various types of containers, with an inside volume ranging from 20 to 250 liters, and designed for different uses, without requiring significant modifications and variations of the coating technique, or the use of polyethylene or PVC bags or inserts.

Moreover, the process of the present invention is simple, economical, and advantageous, since it does not require a thorough cleaning of the metal surface to be coated, or the use of solvents and other polluting substances, and produces coatings which can be easily removed and disposed of simply by way of combustion, without releasing any polluting substances in the environment.

As previously stated, the process of the present invention adopts an electrostatic deposition technique which consists of fixing a powder of a polyolefin composition to the surface to be coated by means of an electrostatic charge.

Said technique is already known in the art. Particularly known is the use of electrostatic deposition with PVC, LDPE, polyamide, hydrolyzed ethylene/vinyl acetate copolymer and epoxy resin powders. However, the process of the present invention is particularly suitable for containers made up of separate parts, since it allows the coating of said parts before assembly, thus facilitating the operations. Thanks to the choice of the polyolefin compositions used, one easily obtains a homogeneous coating even in the joints after the parts have been assembled by melting the polyolefin compositions after assembly. When the polyolefin compositions used are based on crystalline propylene polymers, the process of the present invention presents significant additional advantages, since the polypropylene compositions used are considerably less expensive than the polyamides, the hydrolyzed ethylene/vinyl acetate copolymers and the epoxy resins. The coatings thus obtained are highly water vapor resistant, have a surface hardness higher than those based on LDPE and hydrolyzed ethylene/vinyl acetate copolymer, higher adhesion to metal surface, in addition to the already mentioned chemical inertia and compatibility with food, and being environment-friendly at the time of disposal.

Accordingly, the present invention provides a process for coating the inner surface of metal containers having an inside volume ranging from 20 to 250 liters, comprising:

1) electrostatically depositing on the inside surface of bottoms, lids and bodies of containers, a polyolefin composition selected from the group consisting of:
   a) a polyethylene selected from HDPE, LDPE or LLDPE which have a melt index E (determined by ASTM 1238, condition E) ranging from 1 to 70, and preferably from 5 to 40 dl/g; and
   b) a polypropylene compositions having melt index L (determined according to ASTM D-1238, condition L) ranging from 15 to 150, preferably from 60 to 90 g/10 minutes, comprising one or more of the following components:
      (i) a crystalline homopolymer of propylene;
      (ii) a propylene/ethylene crystalline random copolymer;
      (iii) a propylene/ ethylene/$C_4$-$C_{10}$ $\alpha$-olefin crystalline random copolymer; and optionally,
      (iv) an ethylene/propylene elastomeric copolymer or ethylene/1-butene elastomeric copolymer;
      (v) a polypropylene modified with polar groups; or
      (vi) a mixture of (iv) and (v);

said polyolefin composition being in powder form with the diameter of the particles not exceeding 600 micrometers and having a particle size distribution wherein (percentages by weight) no more than 25%, preferably no more than 4% of the powder has a particle diameter ranging from 300 to 450 micrometers, and no more than 10%, preferably no more than 0.6%, has a particle diameter greater than 450 micrometers;
2) pre-melting the polyolefin composition deposited in step(1); and
3) assembling the bottoms, lids and bodies of the containers, and subsequently melting the polyolefin composition.

Examples of $C_4$–$C_{10}$ $\alpha$-olefins optionally present in the crystalline propylene random copolymer are 1-butene; 1-hexene; 1-octene; 4-methyl-1-pentene; 6,6-dimethyl-1-pentene.

When present, the $C_4$–$C_{10}$ $\alpha$-olefins generally range in quantity from 2% to 10% by weight.

Examples of preferred crystalline propylene homopolymers or random copolymers are:

isotactic polypropylene having an isotactic index up to 99;

propylene/ethylene crystalline random copolymers having an ethylene content ranging from 1% to 7% by weight, more preferably from 2% to 4.5%;

propylene/ethylene/1-butene crystalline random copolymers with an ethylene content ranging from 1.5% to 3% by weight, more preferably from 2% to 2.2%, and a 1-butene content ranging from 4% to 10% by weight.

Examples of preferred polymers for component (iv) are the ethylene/propylene elastomeric copolymers having a propylene content ranging from 30% to 70% by weight, more preferably from 40% to 45%.

Component (v) is preferably a polypropylene homopolymer with various degrees of crystallinity, modified with maleic anhydride or isophorone bismaleamic acid, or acrylic acid, in quantities ranging from 0.5% to 10% by weight. The modification is carried out by using known methods, mixing the polypropylene and modifying agent, in the solid state or in solution, preferably in the presence of radical initiators, such as organic peroxides. If present, components (iv) and (v) preferably range in quantities up to 70% by weight, and from 0. 5% to 10% by weight, respectively. Besides the above mentioned components, the polyolefin compositions used in the process of the present invention can also contain various additives which are useful in terms of modifying properties, like pigments for example, such as titanium dioxide.

The polyolefin compositions used in the process of the present invention are generally prepared by extrusion and subsequent milling. For this purpose one uses known types of extruders, single-screw or twin-screws, operating at temperatures that allow one to obtain a fluid and extrudable mass. Generally, the extrusion temperature varies from 170° to 230° C.

In order to obtain the above mentioned melt index values it may be appropriate to add a free-radical generator in extrusion, preferably in the form of an organic peroxide. Examples of organic peroxides are: 1,1-bis(tert-butylperoxide)3,5,5-trimethylcyclohexane; tert-butylperbenzoate; 2,2-bis (tert-butylperoxy) butane; dicumyl peroxide; di-tert-amyl peroxide; di-tert-butyl peroxide; 1,3-bis(tert-butylperoxy isopropyl)benzene; 2,5-dimethyl-2, 5bis(tert-butylperoxy) hexane.

when they are needed, the free radicals generators are generally used in quantities from 0.05% to 0.2% by weight with respect to the weight of the polypropylene composition.

The pellets obtained from the extrusion of the polyolefin compositions must be reduced to a powder having the particle size distribution described above. For this purpose known techniques can be used; in particular, in the case of polypropylene compositions, it is possible to use the cryogenic milling technique where the mills are cooled with liquid nitrogen, for example. The formation, during the milling process, of particularly fine powder fractions is not a disadvantage in terms of the process of the present invention.

Before the electrostatic deposition, the surface to be coated can be treated in different ways, such as the removal of greasy and crusty substances, and sanding. However, as previously stated, the process of the present invention generally does not require any cleaning or pretreatment of the metal surface in order to obtain a good adhesion of the coating. To improve adhesion, one can apply a primer to the metal surface to be coated prior to the electrostatic deposition. Examples of such primers are the epoxy resins, which can be used in solution in proper solvents, and aqueous solutions of chromates (10% by weight, for example). In both cases the solvent is eliminated by heating prior to the electrostatic deposition. The layer of polyolefin composition powder which is deposited on the metal surface generally ranges from 100 to 500 micrometers, preferably from 150 to 250 micrometers.

The apparatus used for the electrostatic deposition can be of various types and dimensions, depending on the kind of container to be coated. Generally speaking, said apparatus comprise one or more sections where the inner surface of the separated parts of the container to be coated is subjected to a spraying of the polyolefin composition powders described above, which are charged electrostatically either before or during the spraying step. The electrostatic charge is imparted by way of generators which are preferably connected to the spraying devices.

In particular, the Applicant has perfected an apparatus suitable for the inside coating of metal containers having an internal volume ranging from 20 to 250 liters by means of the process defined above, said apparatus comprising:

1) a feeder for conveying bottoms and lids of the containers into one of the spray booths defined in (2), and another feeder for conveying the bodies of the containers in the other spray booth defined in (2) ;
2) two spray booths, one for spraying the bottoms and lids and the other for spraying the bodies of the containers, each having one or more powder spraying devices connected to one or more electrostatic generators.

Preferably, in order to obtain a homogeneous deposition of the polymer powder on the inside of the bodies of the containers, the specific spraying booth is equipped with a device which keeps rotating the bodies of the containers.

Preferably, said spraying devices are guns, more preferably said guns are equipped with mechanisms which keep moving them in various directions. Moreover, it is important that the booths be connected with a recovery and recycling line for the powders which do not remain fixed on the metal surface to be covered.

As previously stated, the polyolefin composition powder fixed on the metal surface by electrostatic deposition is subjected to a pre-melting in step (2) of the process, and to a melting in step (3) in order to obtained a perfect coating. Said steps (2) and (3) are preferably carried out keeping the pieces and the assembled containers at a temperature ranging from 160 to 300° C., for 1–30 minutes. The times and temperatures used in the above mentioned steps can be the same or different. Conventional heating devices can be used, in particular conventional or induction furnaces. The process of the present invention can be applied also to metal containers which are already coated, thus obtaining a multi-layer coating.

The following example is given in order to illustrate and not limit the present invention.

Some cylindrical metal containers having a base diameter of 571.5 mm and a height of 872 mm are coated internally using the apparatus described above.

The polyolefin composition used for the coating in the examples comprises (percentage by weight):

80.5% of a propylene/ethylene crystalline random copolymer;

12% of an ethylene/ propylene elastomer containing 60% of ethylene;

3.5% of a propylene homopolymer modified with maleic anhydride, containing 1.6% of grafted maleic anhydride;

4% of $TiO_2$.

The above mentioned composition has a melt index of 80 g/10 min (obtained by way of peroxide degradation) and is in the form of powder having the following particle size distribution (percentage by weight):

no more than 5% of powder with a particle diameter ranging from 250 to 300 micrometers;

no more than 1% of powder having a particle diameter higher than 300 micrometers;

maximum diameter of the particles about 350 micrometers.

The bottoms, lids and bodies of the containers are coated separately, on their inside surface, by electrostatic deposition of the above mentioned polyolefin composition in powder form.

Electrostatic guns are used to spray the polymer powder.

The pieces, which are coated cold, are then conveyed in a 180° C. furnace wherein they are kept at said temperature for about 10 minutes. The coating obtained is 100–300 micrometers thick.

The containers are then assembled, painted externally, and conveyed in a furnace at 170° C. wherein they are kept at said temperature for 15 minutes in order for the paint to harden and for the final melting of the coating to occur.

The values of the adhesion measured according to ASTM D 3359 ranges from 4B to 5B.

As a variation one can spray 20–40 micrometers of liquid epoxy resin before the powder is sprayed. In this case the adhesion is 5B.

Other features, advantages and embodiments of the invention disclosed herein will be readily apparent to those exercising ordinaly skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for coating the inner surface of metal containers having an inside volume ranging from 20 to 250 liters, comprising:

1) electrostatically depositing on the inside surface of bottoms, lids and bodies of containers, a polyolefin composition selected from the group consisting of:

a) a polyethylene selected from the group consisting of HDPE, LDPE and LLDPE, said polyethylene having a melt index E ranging from 1 to 70 dl/g; and b) a polypropylene composition having melt index L ranging from 15 to 150 g/10 minutes and comprising at least one of the following components (i) to (iii):

(i) a crystalline homopolymer of propylene;

(ii) a propylene/ethylene crystalline random copolymer; and (iii) a propylene/ethylene/$C_{4-10}$ α-olefin crystalline random copolymer; and optionally, one of the following components (iv) to (vi):

(iv) an elastomeric copolymer selected from the group consisting of ethylene/propylene elastomeric copolymer and ethylene/1-butene elastomeric copolymer;

(v) a polypropylene modified with polar groups; and (vi) a mixture of (iv) and (v); wherein said polyolefin composition is in powder form with the diameter of the particles not exceeding 600 micrometers and having a particle size distribution wherein no more than 25% of the powder has a particle diameter ranging from 300 to 450 micrometers, and no more than 10% have a particle diameter greater than 450 micrometers;

2) pre-melting the polyolefin composition deposited in step (1); and 3) assembling the bottoms, lids and bodies of the containers, and subsequently melting the polyolefin composition.

2. The process of claim 1, wherein component (iv) in the polypropylene composition is an ethylene/propylene elastomeric copolymer containing from 30% to 70% by weight of propylene, said component (iv) being present in quantities up to 70% by weight.

3. The process of claim 1, wherein component (v) in the polypropylene composition is a polypropylene modified with maleic anhydride or isophorone bismaleamic acid or acrylic acid in quantities from 0.5% to 10% by weight, said component (v) being present in quantities from 0.5 to 10% by weight.

4. The process of claim 1, wherein prior to the electrostatic deposition, the metal surface to be coated is treated with an adhesion primer.

5. The process of claim 1, wherein the layer of polyolefin composition that is deposited electrostatically on the metal surface has a thickness of between 100 and 500 micrometers.

6. The process of claim 1, where steps (2) and (3) are carried out keeping the individual pieces and assembled containers at a temperature ranging from 160 to 300° C. for 1–30 minutes.

* * * * *